Patented Oct. 9, 1951

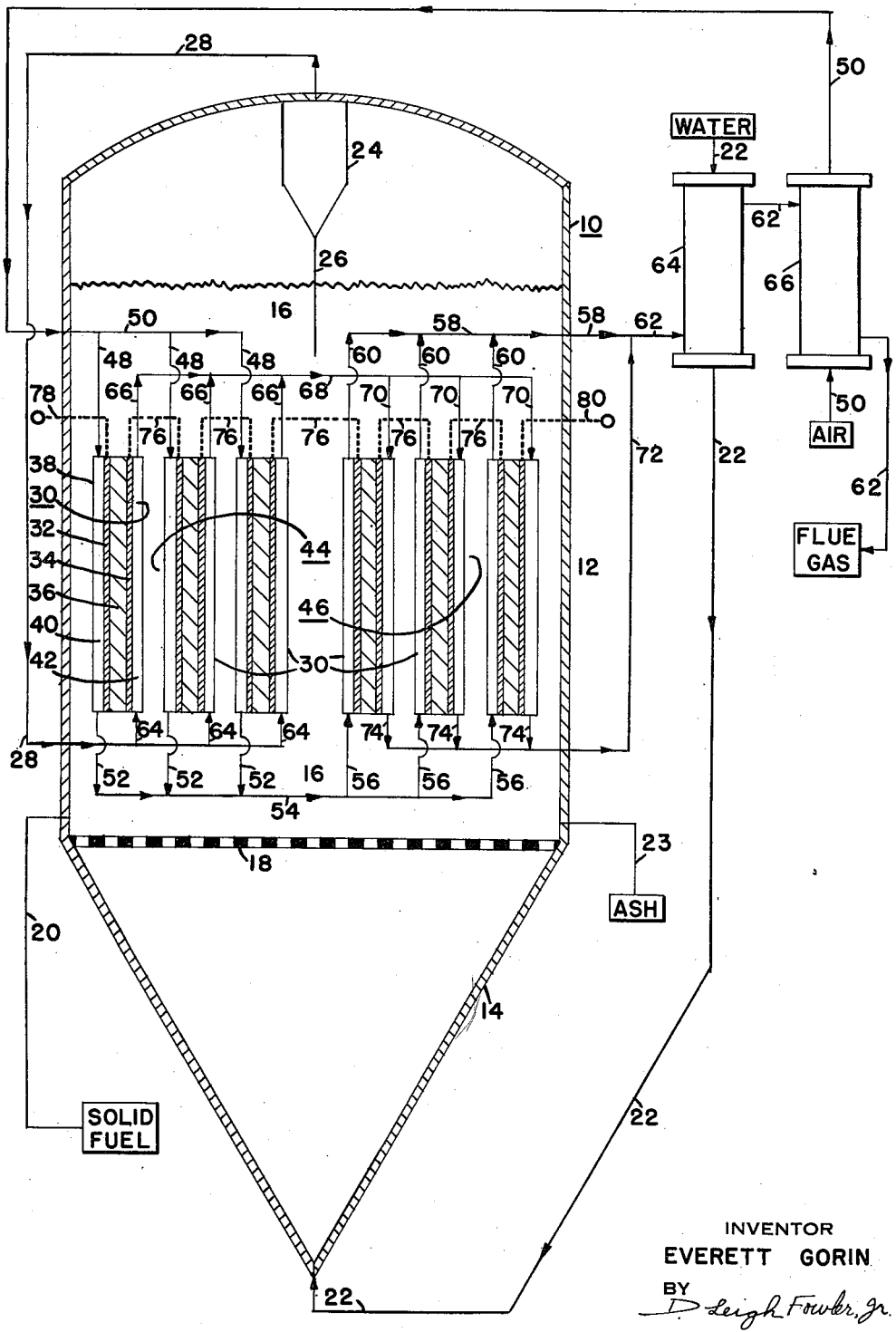

2,570,543

UNITED STATES PATENT OFFICE 2,570,543

CONVERSION OF CARBON TO ELECTRICAL ENERGY

Everett Gorin, Whitehall, Pa., assignor to Pittsburgh Consolidation Coal Company, Pittsburgh, Pa., a corporation of Pennsylvania Application June 17, 1950, Serial No. 168,806

7 Claims. (Cl. 136—84)

This invention relates to the conversion of carbon to electrical energy and, more particularly, to process and apparatus for converting carbon to electrical energy through the medium of a fuel cell.

Fuel cells have been proposed and developed which are adapted to generate electricity by the combustion of water gas (carbon monoxide and hydrogen) using air as the oxidizing gas. Particular success has been achieved when the cells are operated at high temperatures. In the prior fuel cells of this type, the water gas is first generated in a separate gasification zone and then fed to the cathode end of a fuel cell. The over-all efficiency of conversion of carbon to electric power in such systems, assuming that the maximum efficiency heretofore realized in each of the two separate steps is achieved, is of the order of 40 per cent.

In accordance with my invention, a process is provided for converting carbon to electrical power which has an over-all efficiency as high as 75%. This process comprises reacting steam and carbon in a gasification zone to yield a gaseous product containing principally carbon monoxide and hydrogen. This gaseous product is then conducted to an electrochemical reaction zone comprising one or more fuel cells which are designed to operate at elevated temperatures and which are immersed directly in the steam-carbon reaction zone. An oxidizing gas e. g. air, is circulated to the oxygen electrode of the fuel cell from which it is transported to the water gas electrode through the electrolyte in the form of an oxidizing ion whereby the water gas is burned and the heat of combustion thereof is in part converted to electrical energy. The remainder of the heat of combustion is released at the operating temperature of the fuel cell, preferably 700°–900° C. and transferred directly to the carbon in the steam-carbon reaction zone. The excess heat thus released is utilized to maintain the steam-carbon reaction zone at reaction temperature. By proper selection of reaction conditions in this latter zone, a water gas is produced for supplying the fuel cell; and an over-all efficiency of carbon to electricity conversion is obtained which surprisingly is nearly double that of prior systems.

For a better understanding of the present invention and its objects, reference should be had to the following detailed description of a preferred embodiment of the invention, and to the accompanying drawing in which is shown, partly diagrammatically and partly in section, an apparatus in which the preferred embodiment may be practiced.

Referring specifically to the accompanying drawing for a detailed description of the apparatus, numeral 10 designates a gas generating vessel having a substantially cylindrical top section 12 and an inverted cone-shaped bottom section 14. This vessel is adapted to confine a fluidized bed of solids 16 at steam-carbon reaction temperatures and pressures. A grid element 18 is provided at the top of the cone-shaped section 14 for supporting the bed 16. Associated with the bottom portion of the vessel is a solids feed conduit 20 which is adapted to carry solids into the vessel 10. A conduit 22 is connected to the apex of the cone-shaped bottom of vessel 10 for carrying steam into the vessel. At the top of vessel 10 a cyclone separator 24 is provided which is adapted to separate any solid fines that may be entrained in the product gas and return them to vessel 10 through a dipleg 26. Leading from the cyclone separator is a conduit 28 for conducting the product water gas to a plurality of fuel cells 30.

The fuel cells 30 are identical in construction and are adapted to operate at high temperatures in the range of 600° to 1000° C. Each of them comprises two rectangular plate electrodes 32 and 34, arranged vertically in parallel spaced relationship to each other. Electrode 32 constitutes the anode of the cell and consists of iron-magnetite. Electrode 34 constitutes the cathode of the cell and consists of iron-iron oxide. The two electrodes are separated by a solid electrolyte 36 consisting of a glass prepared from a mixture of sodium silicate, monazite sand, tungsten trioxide and sodium carbonate. A suitable composition, for example, consists of 43% sodium carbonate, 27% monazite sand, 20% of tungsten trioxide and 10% sodium silicate. The glass is stamped in the form of a flat rectangular plate and is pressed between the two electrodes. It is to be understood that the composition of the fuel cell per se forms no part of the present invention, it being sufficient for my purpose that the cell be adapted to operate at elevated temperatures. Such cells are fully described in the literature. Gas Cell with Solid Electrolyte—Bull. Acad. Sci. USSR. Classe Sci. Tech. 215–218 (1946); Zeit. fur Electrochemie 27, 199–208; Zeit. fur Electrochemie, 44, 727–32, (1937).

Each of the fuel cells 30 is provided with a box-like metal housing 38 having side walls spaced from the electrodes 32 and 34 to provide gas passages 40 and 42 respectively. Passage 40 is adapted to carry an oxidizing gas in intimate contact with electrode 32, while passage 42 is adapted to carry water gas in intimate contact with electrode 34.

The plurality of fuel cells 30 are divided into two sections 44 and 46 with an equal number of cells in each section. The cells in a given section are arranged in parallel while the two sections are arranged in series with respect to gas flow therethrough. The arrangement of banks of cells in series is adapted to minimize the loss in cell voltage due to the decrease in partial pressure of the reactants as they are consumed in the cell reaction. Air is circulated to the upper ends of passages 40 in the cells of section 44 through conduits 48 from a main air conduit 50. Conduits 52 connect the lower ends of passages 40 with an interconnecting conduit 54. The latter in turn is connected to the lower end of passages 40 of the cells in section 46 by means of conduits 56. The upper ends of passages 40 of the cells in section 46 are connected to a flue gas conduit 58 by means of conduits 60. Conduit 58 joins with a conduit 62 for discharging flue gas to any suitable place. Heat exchange between the flue gas line 62 and steam line 22 and air line 50 is provided by means of heat exchangers 64 and 66 respectively.

The water gas conduit 28 is connected to the lower ends of the passages 42 of the cells in section 44 by conduits 64. The upper ends of passages 42 communicate by means of conduits 66 with a conduit 68 which is adapted to convey gas from the passages 42 in section 44 to the upper ends of passages 42 in section 46 through passages 70. The lower ends of passages 42 of the cells in section 46 communicate with a flue gas conduit 72 through conduits 74. Conduit 72 joins with conduit 62.

The cells 30 are connected in series by electrical conductors 76 extending between electrodes. Electrical conductors 78 and 80 constitute the terminal leads of the cell system and may be connected to any electrical storage or power driven unit.

The operation of the above system will now be described as applied to the conversion of the carbonaceous residue known as char which is produced by the low temperature carbonization of coal. I prefer to use this char because of its high reactivity at the temperatures employed in my invention. I also prefer to maintain the char in a fluidized condition in the gasification zone because of the efficiency of heat transfer thereby provided.

Finely divided char is fed into vessel 10 through solids feed conduit 20 by any suitable means such as a motor driven screw (not shown). At the same time, steam is circulated from conduit 22 through grid 18 and up through the bed of char under fluidizing conditions. The level of the resulting fluidized bed of char is maintained above the fuel cell system so that the latter is completely immersed in direct heat transfer relationship with the char. Heat is supplied to the gasification zone from the fuel cells in a manner to be more fully described below. The resulting temperature in the char bed is a few degrees below that of the cells which is preferably between 700° and 900° C.

The products of the steam-carbon reaction comprise an ash or a low carbon solid which may be withdrawn through conduit 23 as necessary to maintain the desired bed level, and a gaseous mixture containing principally carbon monoxide and hydrogen. The gaseous product is conducted to the cyclone separator 24 and there freed of any entrained solid fines which are returned to the fluidized bed 16 through dipleg 26. The solid free gas is then conveyed through conduit 28 and conduits 64 to the lower ends of passages 42 of the fuel cells in section 44. Concurrently, therewith air is fed through conduit 50 and conduits 48 to the upper ends of passages 40 of the fuel cells in section 44.

At the anodes 32 of the cells in section 44 electrons are picked up by the iron oxide to release oxide ion or its equivalent into the solid electrolyte. The oxygen contained in the air circulating through passages 40 reacts with iron to maintain its state of oxidation, the remaining nitrogen and unreacted oxygen being discharged through conduits 52 and 54. At the cathodes 34 oxide ion is discharged to release electrons and oxidize the electrode to a higher oxide of iron. The CO and $H_2$ circulating through passages 42 reduce the higher iron oxide thus formed and are converted to $CO_2$ and $H_2O$ which are discharged along with unreacted CO and $H_2$ through the conduits 66 and 68. A portion of the energy thus released by the combustion of the water gas generates electricity through the medium of the electrolyte 36. The flue gases produced in the cell system are discharged therefrom through conduits 58 and 72 into a common conduit 62. The heat of the flue gas is utilized to preheat the incoming steam and air at heat exchangers 64 and 66. The same cell reactions occur in the second section 46 between the electrodes and the unreacted gases from the first section 44, but with the gases circulating in an opposite direction from that in section 44.

The electricity generated by the fuel cells is conducted from the cell system through the electrical leads 78 and 80. The individual cells generate a voltage in the range of 0.5–0.9 depending on the density of the current withdrawn from the cell. The remainder of the energy is released as heat and transferred to the fluidized bed 16 in which the cells are immersed. The cells are designed to operate at about 700° to 900° C. and to maintain the temperature of the bed 16 from 25° to 50° C. below that of the cells. Because of the use of the fluidized bed, the heat developed by the cells is transferred rapidly and uniformly to all parts of the bed. A minor amount of sensible heat is lost from the system in the exhausted flue gases from the cells but this is recovered in part by transfer to the inlet steam and air lines.

It is to be understood that the number of fuel cells shown is only for the purpose of illustration. The precise number employed will depend on the design of the particular system and on the capacity desired.

As a specific example of the operation of the above system to convert char to electrical energy, the following conditions and results are cited. The temperature of the fuel cells is 827° C. and that of the fluidized bed of char is 800° C. Under these conditions the efficiency as a function of the steam conversion is given in the table below. The efficiency is defined as the electrical energy output of the cell divided by the heat of combustion of the char consumed.

| Steam conversion, (per cent) | 35 | 55 | 70 | 90 |
|---|---|---|---|---|
| Thermal efficiency, (per cent) | 50.7 | 68.2 | 73.3 | 75.5 |

The advantage of my system over operation of the fuel cell with independently produced water gas is quite apparent. In the latter system, the over-all efficiency may under optimum conditions be as high as 41.6% as compared with a maximum of 75% obtained in the above described process.

It is to be noted that to obtain the maximum efficiency it is necessary to obtain steam conversions greater than 70%. To achieve such high steam conversions at the temperatures employed, highly reactive chars must be employed or a gasification catalyst such as $Na_2CO_3$ must be added. It is also desirable to operate the fluid bed with a steam feed rate just above that required to obtain incipient fluidization i. e. at a superficial linear velocity of 0.1–0.5 F. P. S. when employing —65 mesh char. This is necessary to obtain a relatively high steam conversion at the low temperatures employed. The use of a catalyst permits operation at a lower cell operating temperature which improves the efficiency of the system. Should it be necessary to operate the system at steam conversions less than that required for maximum thermal efficiency, it is advisable to operate the cells at a higher current density, and thus compensate economically for the lower overall thermal efficiency.

My system may also be operated by using a gaseous carbonaceous material such as natural gas in place of char. In this case the char-steam reaction is replaced by the methane-steam reaction which is carried out, for example, in heat exchange relationship with the fuel cells by the use of a fluidized nickel-alumina catalyst at 650°–800° C. As before CO and $H_2$ are produced as fuel to the cells. The use of this technique permits a thermal efficiency in the conversion of methane to electrical energy of 73.8%.

In this specification and in the accompanying claims, the term "carbon" is used to designate any carbon containing material capable of reacting with steam to produce carbon monoxide and hydrogen.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of converting carbon to electrical energy which comprises reacting steam and carbon in a gasification zone under conditions conducive to the formation of a gaseous product containing principally CO and $H_2$, circulating said gaseous product and an oxidizing gas separately through an electrochemical reaction zone at an elevated temperature whereby said gaseous product is oxidized and its heat of combustion is converted in part to electrical energy, maintaining the temperature of said electrochemical zone by the heat of combustion of said gaseous product above that required to react steam and carbon, conducting the electrochemical reaction in heat exchange relation with said gasification zone to thereby provide heat for the steam-carbon reaction, and recovering the electrical energy produced.

2. The process of converting carbonaceous solids to electrical energy which comprises circulating steam through a bed of finely divided carbonaceous solids under fluidizing and reacting conditions, whereby a gaseous product containing principally carbon monoxide and hydrogen is obtained, circulating air and said gaseous product through an electrochemical reaction zone wherein said gaseous product is oxidized and its heat of combustion converted in part to electrical energy, maintaining the temperature of said zone by the heat of combustion of said gaseous product at an elevated temperature above that required to react steam and carbon, conducting the electrochemical reaction in said zone in heat exchange relation with said bed of fluidized solids, whereby the heat of combustion of said gaseous product which is not converted to electrical energy is transferred to said bed to thereby maintain the temperature of said solids at steam-carbon reaction temperatures, and recovering the electrical energy produced.

3. The method according to claim 2 in which a steam-carbon reaction promoting catalyst is added to the fluidized bed of solids.

4. The method according to claim 2 in which the carbonaceous solids consist of char produced by the low temperature carbonization of coaly materials.

5. The method according to claim 2 in which the electrochemical reaction zone is maintained at a temperature between 700° and 900° C.

6. The process of converting a methane containing gas to electrical energy which comprises circulating steam and a methane containing gas through a bed of finely divided methane-steam reaction catalyst under fluidizing and reacting conditions, whereby a gaseous product containing principally carbon monoxide and hydrogen is obtained, circulating air and said gaseous product through an electrochemical reaction zone wherein said gaseous product is oxidized and its heat of combustion converted in part to electrical energy, maintaining the temperature of said zone by the heat of combustion of said gaseous product at an elevated temperature above that required to react steam and methane, conducting the electrochemical reaction in said zone in heat exchange relation with said bed of fluidized solids, whereby the heat of combustion of said gaseous product which is not converted to electrical energy is transferred to said bed to thereby maintain the temperature of said solids at steam-methane reaction temperatures, and recovering the electrical energy produced.

7. An apparatus for converting carbon to electrical energy which comprises, in combination, a vessel adapted to confine a steam-carbon reaction zone, means associated with said vessel for feeding carbon into said zone, means associated with said vessel for introducing steam into said zone, a fuel cell adapted to convert carbon monoxide and hydrogen by electrochemical reaction to electrical energy and heat and being arranged within said vessel in heat exchange relation with said steam-carbon reaction zone, said fuel cell also being designed to operate at elevated temperatures above steam-carbon reaction temperatures, means for circulating an oxygen containing gas in intimate contact with an electrode of said fuel cell, means for circulating gaseous product from said steam-carbon reaction zone in intimate contact with the other electrode of said fuel cell, and means associated with said fuel cell for recovering the electrical energy produced.

EVERETT GORIN.

No references cited.